Oct. 20, 1931.    H. C. LORD    1,828,539
VIBRATION DAMPENER
Filed Dec. 10, 1926

INVENTOR.

Patented Oct. 20, 1931

1,828,539

UNITED STATES PATENT OFFICE

HUGH C. LORD, OF ERIE, PENNSYLVANIA

VIBRATION DAMPENER

Application filed December 10, 1926. Serial No. 153,875.

This invention is in the form of an improvement in relation to the dampeners described in Letters Patent issued to me Oct. 26th, 1926, #1,603,348 and in an application filed by me #68,795, Nov. 13th, 1925. In dampeners of this type where the resilient member supplies the active friction surface for the dampener the thickness of the resilient portion is reduced as it wears and this varies the relation with which it yields prior to the slipping, or rubbing action. Thus the relation of the yielding member with the total travel is disturbed. The present invention is designed to obviate this difficulty by supplying non-resilient wear surfaces so that as the wear progresses the body of the resilient member remains constant and consequently the proper relation remains undisturbed. Features and details of the invention will appear from the specification and claims.

The invention is illustrated in the accompanying drawings as follows:—

Figure 1:
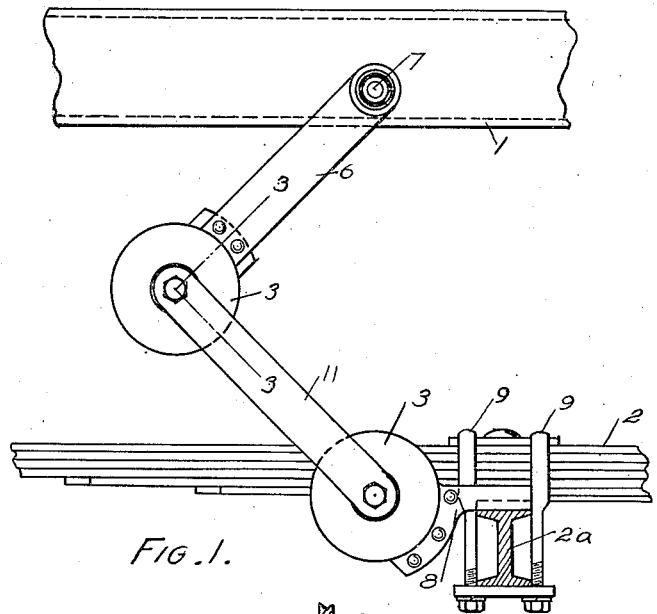

Fig. 1 shows a side elevation of the dampener installed.

Figure 2:
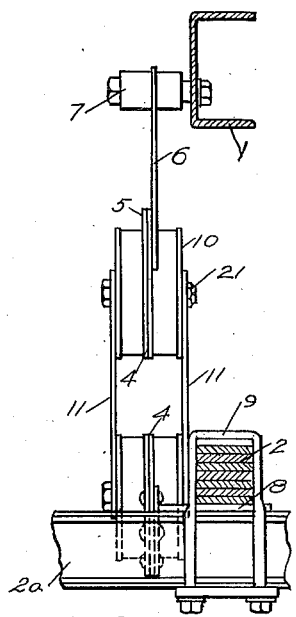

Fig. 2 an end view.

Figure 3:
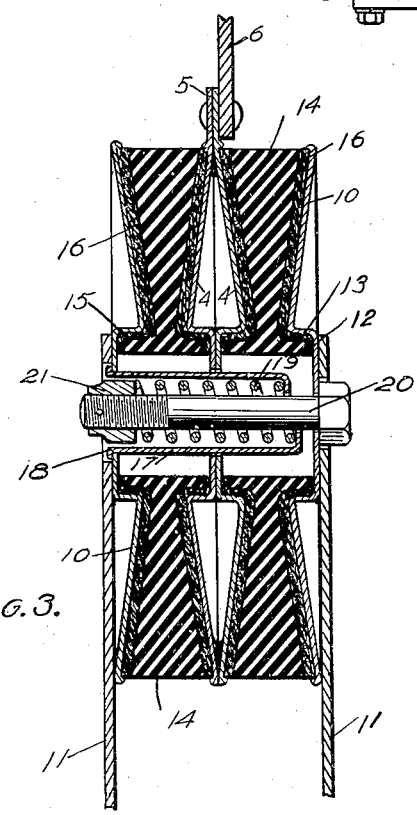

Fig. 3 a section on the line 3—3 in Fig. 1.

1 marks a portion of an automobile frame, 2 the springs and 2a the axle. Dampener elements 3—3 are similar in construction. They have the central wear plates 4 with securing extensions 5. The extension 5 of one of the elements is secured to a link 6 pivotally secured at 7 to the frame 1. The wear plate 4 of the other element is secured to a bracket 8 which is secured in spring clips 9.

Outer wear plates 10 oppose the wear plates 4 and these are connected by links 11 which are secured to the outer peripheries of the plates and also to the central portions 12 of the plates. The plates 4 and 10 have guide shoulders 13 formed at their inner peripheries. Resilient central members 14, formed ordinarily of resilient rubber are arranged between the wear plates and these are provided with shoulders 15 which assist in holding them centrally although the tapered portion may accomplish this purpose, or the resilient member may be secured at one side allowing all the wear at the opposite side, if desired. In any event both surfaces of the resilient member are backed by the surfaces of the movable members engaging them so as to communicate the squeezing pressure to the resilient member.

Non-resilient wear members 16 are arranged between the resilient members 14 and the wear plates 4 and 10. These may be formed of leather, or material similar to brake lining or clutch facings, the purpose being to get a material of high friction efficiency and comparatively non-resilient so that the resilient, or yielding portion of the combined resilient member 14 and wear members will remain substantially constant and thus the relation of yielding prior to slippage may be maintained constant.

A spring socket 17 has a head 18 and extends in from one of the outer wear plates. A bolt 20 extends from the opposite outer wear plate through the spring socket. A spring 19 is arranged in the spring socket and a nut 21 on the bolt 20 is adapted to tension the spring.

In the operation of the device the movable members 10 move relatively to the members 4 with each movement up, or down, of the frame 1 relatively to the axle. With the initial movement of the member 10 relatively to the member 4 the rubber is distorted in shear and there is no frictional movement between the surfaces of the movable members 4 and 10 and the surfaces of the resilient member. Thus for a limited movement the device provides what is known as a free center, but with any extended relative movement of the members 4 and 10 the rubber overcomes the frictional resistance between one of the surfaces of the movable members, either 4 or 10, and from there on the relative movement between the movable members is accommodated by the frictional movement of the resilient member on the surface of the movable member backing the rubbing surface of the resilient member. Thus for limited movements the yielding of the rubber accommodates the movement. For extended movements the frictional action between the surfaces accommodates the movement and thus effects the dampening.

What I claim as new is:—

1. In a vibration dampener, the combination of two relatively movable members; and a friction member backed by the movable members and rubbing with at least one of the movable members, the friction member being formed with a pad of resilient rubber and a comparatively non-resilient wearing portion.

2. In a vibration dampener, the combination of two relatively rotatable members; and a friction member backed by the rotatable members and rubbing with at least one of the members, said friction member comprising a resilient section and a wear section, the resilient section being formed of a pad of resilient rubber and the wear section being comparatively non-resilient.

3. In a vibration dampener, the combination of two relatively movable members; and a friction member between the relatively movable members backed by said members and rubbing on at least one of said members, said friction member having a section formed of resilient material and a wear surface of comparatively non-resilient material, the resilient material of said friction member yielding without rubbing with an initial movement of the movable members and rubbing with a maximum movement of said members.

4. In a vibration dampener, the combination of two relatively rotatable members; and a friction member between the relatively rotatable members backed by said members and rubbing on at least one of said members, said friction member having a section formed of resilient material and a wear surface of comparatively non-resilient material, the resilient material of said friction member yielding without rubbing with an initial movement of the rotatable members and rubbing with a maximum movement of said members.

In testimony whereof I have hereunto set my hand.

HUGH C. LORD.